United States Patent [19]

Griggs

[11] Patent Number: 4,489,612
[45] Date of Patent: Dec. 25, 1984

[54] VIBRATION TESTING APPARATUS

[75] Inventor: Frederick J. M. Griggs, Royston, England

[73] Assignee: Ling Dynamic Systems Limited, Royston, England

[21] Appl. No.: 492,834

[22] Filed: May 9, 1983

[30] Foreign Application Priority Data

May 12, 1982 [GB] United Kingdom ................. 8213771

[51] Int. Cl.³ .................. B06B 3/00; G01N 29/00
[52] U.S. Cl. ........................... 73/663; 73/665; 403/388
[58] Field of Search ................. 73/662, 663, 665, 668; 403/354, 386, 388, 393

[56] References Cited

U.S. PATENT DOCUMENTS

| 3,933,033 | 1/1976 | Kimball | 73/665 |
| 4,102,108 | 7/1978 | Cody | 403/388 |
| 4,392,381 | 7/1983 | Martin | 73/663 |

Primary Examiner—Howard A. Birmiel
Attorney, Agent, or Firm—Brisebois & Kruger

[57] ABSTRACT

Vibration testing apparatus comprises a vibration-generator coupled to a horizontal slip plate by means of a driver bar, having limbs which embrace opposite sides of the slip plate. The lower limb of the driver bar is separable from the remainder of the driver bar so as to enable the vibration generator and the remainder of the driver bar to be pivoted away from the slip plate without lateral displacement of the slip plate along its horizontal axis.

10 Claims, 2 Drawing Figures

VIBRATION TESTING APPARATUS

The present invention relates to vibration testing apparatus, otherwise known as shakers, such as are employed in industry for the vibration testing of industrial elements and components.

BACKGROUND OF THE INVENTION

More specifically, the invention is concerned with the type of vibration testing apparatus which comprises a vibration generator unit which is coupled to a slip plate supported on a bearing system, by means of a driver bar. The element or component to be vibration tested is mounted on the slip plate which is supported, e.g. by means of hydrostatic bearings, so that it will slide to and fro in a horizontal plane along a preferred axis of oscillation with little friction, and the slip plate is coupled to the vibration generator by means of the driver bar. In operation, the vibration generator is disposed so as to vibrate along a horizontal axis, but is mounted so that it can be pivoted to a position in which it is capable of oscillating about a vertical axis. In this position it is coupled from the slip table and can be used for other vibration testing operations. Thus, the driver bar which serves to couple the vibration generator to the slip plate is connected to the latter in a disengageable manner, for example by means of bolts, or preferably by means of expander pins which serve to transmit the vibrations from the vibration generator to the slip plate more effectively whilst tolerating dimensional differences due to changes in temperature. When it is desired to pivot the vibration generator about its axis so that it can vibrate along a vertical axis, it is necessary to remove the bolts and/or expander pins to disengage the driver bar from the slip table.

One construction of driver bar according to the prior art comprises a slotted member and the edge of the slip plate is engaged within the slot so that the adjacent arms of the member embrace either sides of the slip plate and receive the connecting bolts and/or expander pins which pass through the arms and the slip plate. With such a construction, when it is desired to disconnect the vibration generator from the slip plate, it is not only necessary to remove the bolts and/or expander pins connecting the driver bar to the slip plate, but it is also necessary to provide sufficient lateral displacement of the slip plate so that it can be moved by a distance to free its edge from the slot in the driver bar and thereby permit the vibration generator coupled to the driver bar to be pivoted clear of the slip plate. This in turn necessitates the use of special bearings for the slip plate in order to provide the necessary degree of lateral shift.

According to another prior art arrangement, the driver bar is of a cantilever type which is arranged so as to overlie only one surface of the slip plate and is connected thereto by means of the connecting bolts and/or expander pins. Whilst such an arrangement facilitates the pivoting of the vibration generator from its horizontal vibration position to its vertical vibration position, since it is only necessary to remove the connecting bolts and/or expander pins to enable the vibration generator to be swung away from the slip plate, such a construction possesses the disadvantage that the vibration force is not applied symmetrically about the median horizontal axis of the slip plate, whereby eccentric or off-centre vibration forces may be applied to the slip plate and hence to any component to tested mounted thereon and this in turn can lead to be difficulties and undesired results.

SUMMARY OF THE INVENTION

It is an object of the present invention to provide an improved arrangement including a driver bar which allows a vibration generator to be readily uncoupled from a slip plate, but in which the vibrational forces can be applied symmetrically about the median horizontal axis of the slip plate.

The invention provides an arrangement comprising a vibration generator coupled to a horizontal slip plate by means of a driver bar, wherein said driver bar has limbs which embrace opposite sides of the slip plate and wherein the lower limb of the driver bar is separable from the remainder of the driver bar so as to enable the vibration generator and said remainder of the driver bar to be pivoted away from the slip plate without lateral displacement of the slip plate along its axis.

In one embodiment of the arrangement according to the invention, the driver bar comprises a central portion in line with the median horizontal plane of the slip plate and of a thickness substantially corresponding to the thickness of the slip plate and one limb in the form of a flange which overlies the upper surface of the slip plate, and the other limb of the driver bar comprises a detachable flange member which can be secured by fastening means passing into or through said driver bar both to the underside of the slip plate and to the central portion of the drive bar.

According to another embodiment of the invention, one limb of the driver bar comprises a flange for overlying the upper surface of the slip plate and a central portion of the driver bar is of a thickness substantially corresponding to the thickness of the slip plate and in line therewith, and the other limb comprises a separate flange member which is integral with or attached to the lower surface of the slip plate and which is detachably secured to the central portion of the driver bar.

With either construction, when the fastening means are removed so as to detach the removable flange from the central portion of the driver bar, the vibration generator and the remainder of the driver bar can readily be pivoted away from the slip table.

The fastening means may comprise either bolts or expander pins or a combination of the two.

BRIEF DESCRIPTION OF THE DRAWINGS

The invention will now be further described by way of example with reference to the accompanying drawings in which.

DESCRIPTION OF THE PREFERRED EMBODIMENTS

Figure 1:
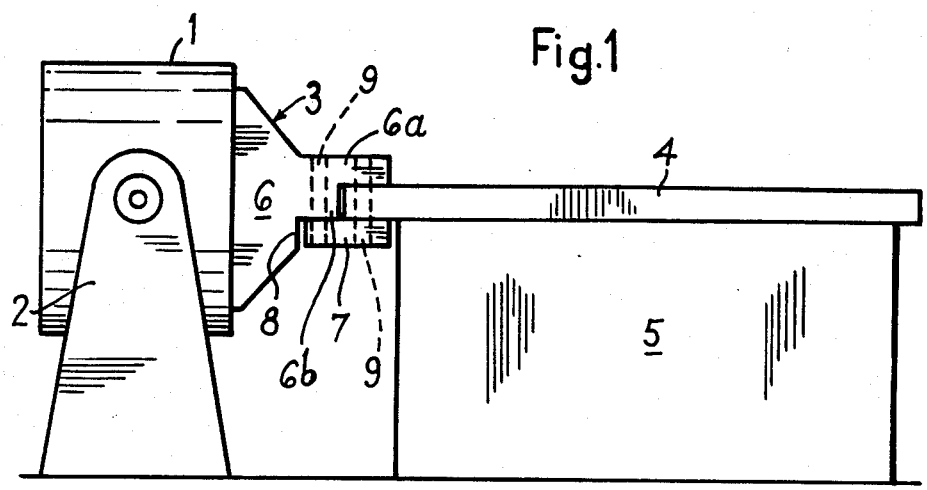
FIG. 1 is a schematic diagrammatic side view of one embodiment of vibration generation apparatus according to the invention.

Referring to FIG. 1, the vibration test apparatus illustrated comprises a vibration generator 1 pivotally mounted in brackets 2 and which, in the position shown, is connected through a driver bar generally indicated at 3 to a slip plate 4.

The vibration generator 1 is of the electromagnetic type including an energisable moving coil disposed in an alternating magnetic field in order to produce the vibrations, and is pivotally mounted in the brackets 2 so that its output member connected to the driver bar 3 can either initiate vibrations along a horizontal axis, i.e. in the position shown in the drawing, or so that it can be pivoted through 90° in order to produce vibrations along a vertical axis.

The slip plate 4 comprises a rigid but light metal plate, e.g. of a magnesium alloy, supported on the support block 5 comprising a large inert mass, for example a granite block. The slip plate rests upon the upper horizontal surface of the support block 5 through an oil film and hydrostatic bearings (not shown) in order to provide a very low friction bearing surface for the slip plate and enable it to oscillate freely along the horizontal axis of vibration.

The output from the vibration generator is coupled to the slip plate by means of the driver bar 3. More specifically, the driver bar comprises a member 6 connected to the output member of the vibration generator and including a flange 6a overlying the upper surface of the slip plate 4, as well as a central portion 6b substantially the same thickness as the slip plate and disposed opposite and adjacent the side edge of the same. The driver bar also includes a separate flange member in the form of a strip 7 of which one portion engages below the edge of the slip plate 4 and the other portion engages in a recess 8 formed below the central portion of the driver bar. The strip 7 is secured to the main portion 6 of the driver bar and to the slip table by means of fastening means indicated at 9, such as bolts or expander pins or a combination of the two means which are distributed in a suitable configuration to provide secure attachment of the driver bar to the slip plate.

In operation in the position shown, the vibrational forces from the vibration generator 1 are applied along a horizontal axis to the slip plate 4, and by reason of the symmetrical arrangement of the driver bar assembly, the horizontal vibration forces are applied substantially symmetrically about the median horizontal axis of the slip plate.

When it is desired to uncouple the vibration generator 1 from the slip plate 4, this can readily be achieved without requiring any inconvenient lateral movement of the slip plate, by merely removing the fastening means 9 and then removing the lower strip portion 7 of the driver bar. The remainder 6 of the driver bar together with the vibration generator 1 can now be pivoted about the pivot axis of the brackets 2 until the vibration generator is disposed about a vertical axis.

Figure 2:
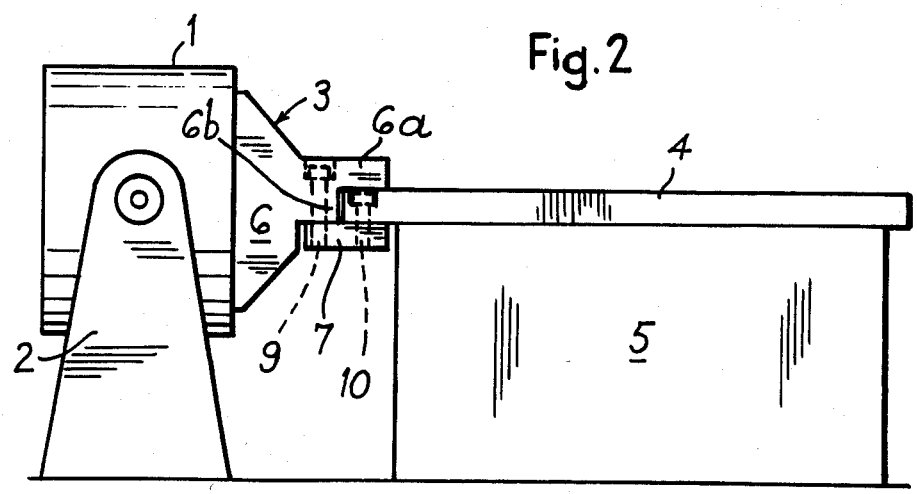
FIG. 2 is a similar view of a further construction according to the invention.

In the modified construction shown in FIG. 2, wherein like parts bear the same references, the lower strip 7 is shown as permanently secured to the edge of the slip plate 4 by means of bolts 10, so that when it is desired to disconnect the driver bar 3 from the slip plate, it is only necessary to remove the series of bolts and/or expander pins 9 passing both through the portion 6 of the driver bar and the lower strip 7. Otherwise the apparatus operates generally in the same manner as that illustrated in FIG. 1.

The present invention therefore provides a vibration test apparatus including a driver bar arrangement which will transmit vibrational energy from the vibration generator to the slip plate with only very small losses and without substantial undesirable assymmetrical vibrational components, but which enables the driver bar to be readily uncoupled from the slip plate so as to allow pivoting of the vibration generator away from the slip plate when desired.

Whilst particular embodiments have been described, it will be understood that various modifications may be made without departing from the scope of this invention. Thus, in the FIG. 2 embodiment the lower strip 7 could be formed as an integral projecting flange along the edge of the slip plate 4.

I claim:

1. Vibration testing apparatus comprising a pivotally mounted vibration generator, a horizontal slip plate, a driver bar coupling said vibration generator to said horizontal slip plate, said driver bar having a central portion opposite the slip plate, an upper limb integral with said central portion and which extends over the upper side of said slip plate, and a separable lower limb which extends beneath the lower surface of said slip plate and which is in separable abutting relationship with said central portion of the driver bar, and means for securing said driver bar to said slip plate, including means enabling said lower limb of the driver bar to be separated from the remainder of the driver bar so as to enable said vibration generator and the remainder of said driver bar to be pivoted away from said slip plate without lateral displacement of the slip plate along its axis.

2. Apparatus as claimed in claim 1, in which the driver bar comprises a central portion in line with the median horizontal plane of said slip plate and of a thickness substantially corresponding to the thickness of the slip plate and an upper limb in the form of an integral flange which overlies the upper surface of said slip plate and wherein the separable lower limb of said driver bar comprises a detachable flange member which can be secured by fastening means passing into or through said driver bar both to the underside of said slip plate and to the central portion of the driver bar.

3. Apparatus as claimed in claim 1, in which the upper limb of the driver bar comprises an integral flange for overlying the upper surface of the slip plate and the central portion of the driver bar is of a thickness substantially corresponding to the thickness of the slip plate and in line therewith and said separable lower limb of the driver bar comprises a flange member which is integral with or attached to the lower surface of the slip plate and which is detachably secured to the central portion of the driver bar.

4. Apparatus as claimed in claim 1, wherein the fastening means for securing the driver bar to the slip plate comprises either bolts or expander pins.

5. Apparatus as claimed in claim 1, wherein the fastening means for securing the driver bar to the slip plate comprises a combination of bolts and expander pins.

6. Apparatus as claimed in claim 1, wherein the vibration generator comprises an electromagnetic vibration generator which is pivotally mounted in brackets so that its output member connected to the driver bar can either initiate vibrations along a horizontal axis for vibrating the slip table or so that, when the driver bar is disconnected from the slip plate, the vibration generator can be pivoted through 90° in order to produce vibrations along a vertical axis.

7. Apparatus as claimed in claim 1, in which the lower limb of the driver bar is in the form of a strip.

8. Vibration testing apparatus comprising a vibration generator, a horizontal slip plate, a driver bar coupling said vibration generator to said horizontal slip plate, said driver bar having an upper limb which extends over the upper side of said slip plate and a lower limb which extends beneath the lower surface of said slip plate and means for securing said driver bar to said slip plate, wherein said lower limb of the driver bar is separable from the remainder of the driver bar so as to enable said vibration generator and the remainder of said driver bar to be pivoted away from said slip plate without lateral displacement of the slip plate along its axis.

9. Apparatus as claimed in claim 8, in which the driver bar comprises a central portion in line with the median horizontal plane of said slip plate and of a thickness substantially corresponding to the thickness of the slip plate and an upper limb in the form of a flange which overlies the upper surface of said slip plate and wherein the lower limb of said driver bar comprises a detachable flange member which can be secured by fastening means passing into or through said driver bar both to the underside of said slip plate and to the central portion of the driver bar.

10. Apparatus as claimed in claim 8, in which the upper limb of the driver bar comprises a flange for overlying the upper surface of the slip plate and a central portion of the driver bar is of a thickness substantially corresponding to the thickness of the slip plate and in line therewith and said lower limb of the driver bar comprises a flange member which is integral with or attached to the lower surface of the slip plate and which is detachably secured to the central portion of the driver bar.

* * * * *